Figure 1:
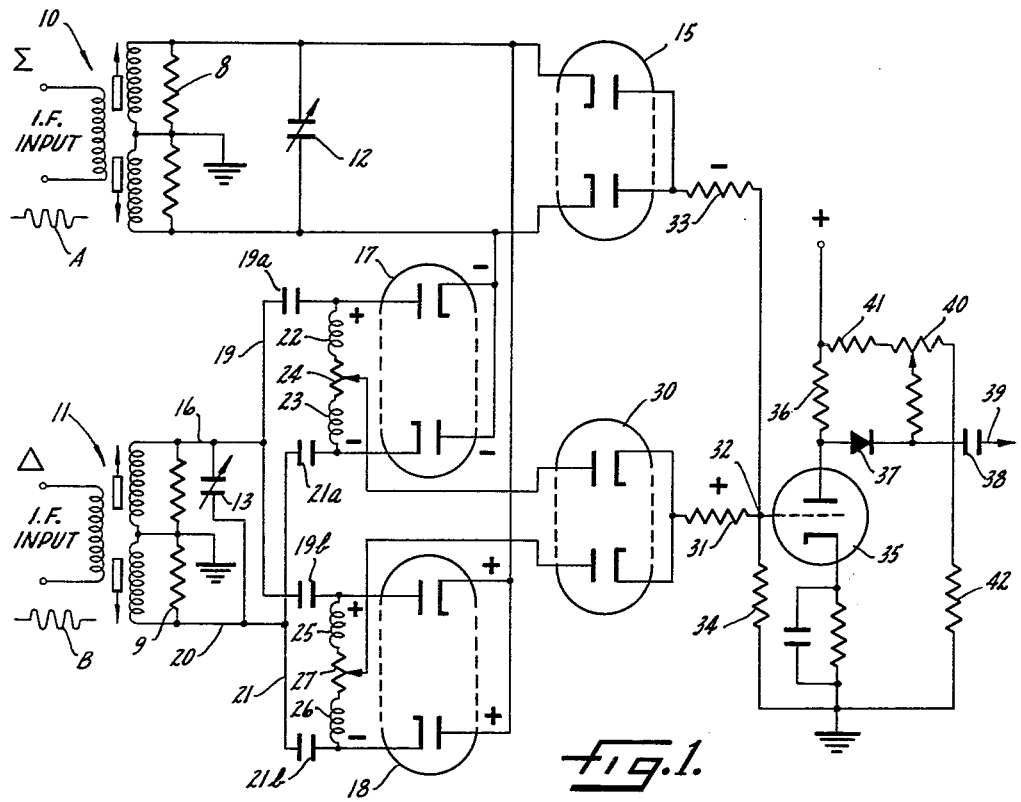

Oct. 27, 1964   R. H. BEGEMAN   3,154,745
DIRECT CURRENT COUPLED CROSSOVER DETECTOR CIRCUIT
Filed Oct. 11, 1961

INVENTOR.
Robert H. Begeman,
BY
H. H. Lock
Attorneys.

United States Patent Office 3,154,745
Patented Oct. 27, 1964

3,154,745
DIRECT CURRENT COUPLED CROSSOVER
DETECTOR CIRCUIT
Robert H. Begeman, Indianapolis, Ind., assignor to the United States of America as represented by the Secretary of the Navy
Filed Oct. 11, 1961, Ser. No. 144,515
12 Claims. (Cl. 328—133)
(Granted under Title 35, U.S. Code (1952), sec. 266)

The invention described herein may be manufactured and used by or for the Government of the United States of America for governmental purposes without the payment of any royalties thereon or therefor.

This invention relates to detector circuits and more particularly for providing a circuit to produce crossover detection of the phase relation of the sum and difference signal information of twin-lobe monopulse radar intercepted target objects to produce a video voltage signal capable of improving the resolution of the target area on a radar indicator or the like.

One form of a monopulse radar system is based on the comparison of the sum and difference of the received radar signals of an intercepted target object for target tracking purposes. These radars can be constructed, and particularly the antennas, to provide either amplitude or phase angle sensing from the sum and difference signals. The sum and difference radar signals are amplified in the intermediate frequency (IF) circuits of the radar receiver and compared in some form of phase comparator circuit to produce video voltage signals applicable to the radar indicator circuits, tracking control circuits, or the like. Prior known crossover detector circuits utilize subtraction circuits and phase detector circuits to convert the incoming signal phase variation or amplitude variation or amplitude variation of the alternating voltage signals into a video signal representative of that phase relation. These prior known systems have shown considerable trouble in overload in direct current restoration, and in delay without improvement of target resolution.

In the present invention the sum and difference target object signals of a twin-lobe monopulse radar intercepted target object from an amplitude phase sensing antenna are utilized in the IF circuits of the radar receiver to produce an output voltage operative in the radar indicator circuit to improve resolution in the target area. In this invention the sum voltage signal information is applied through an IF transformer in a sum channel to a double diode detector for producing pulsed video output voltage applicable at a summing point. The difference voltage signal information is applied through an IF transformer in another channel. The output from the secondary of the difference IF transformer is cross-coupled to a pair of double diodes which are each referenced to one of the secondary outputs of the summing IF transformer. An anode and a cathode of each twin double diode has a potentiometer coupled thereacross, the adjustable tap of which is coupled respectively to two anodes of a clipping double diode. The common cathode pulsed video output of the clipping double diode is connected to the summing point to produce a summed (or difference) video voltage signal. This summed video voltage is applied to a clipping amplifier which produces a video voltage representative in amplitude of the phase relation of the sum and difference target object voltage information to produce high resolution on a target radar indicator, or the like. The clipping amplifier will have its highest video voltage output when the target is on boresight and this video voltage will decrease in amplitude in a direct proportion to the amount that the intercepted target goes off of boresight. It is therefore a general object of this invention to provide a direct current coupled crossover detector circuit for use in the intermediate frequency channel of a radar receiver to produce a video voltage output corresponding in amplitude to the intercepted target phase relation of the sum and difference signal information from a twin-lobe antenna to produce high resolution on the radar indicator in the target area around boresight of the intercepted target.

Figure 2:
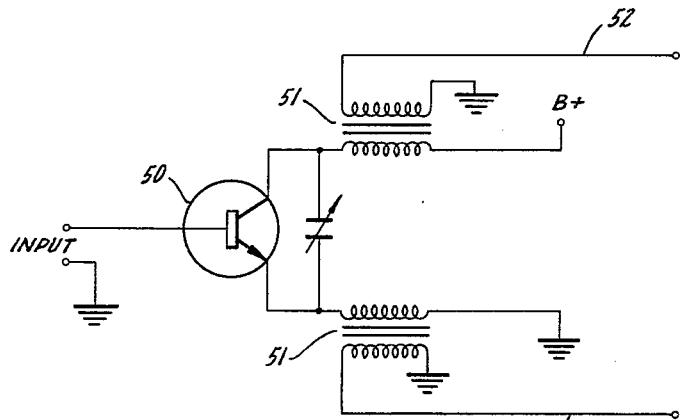

These and other objects and the attendant advantages, features, and uses, will become more apparent to those skilled in the art as a more detailed description proceeds with reference to the accompanying drawing, in which:

FIGURE 1 is a circuit schematic diagram of the direct current coupled crossover detector of this invention; and FIGURE 2 represents a modified IF transformer input for each sum and difference channel utilizing a transistorized IF transformer means.

Referring more particularly to FIGURE 1 there is shown two IF channels adaptable to receive the sum and difference target signal voltage information of a twin-lobe monopulse radar intercepted target object. The sum and difference channels are designated by the symbols $\Sigma$ and $\Delta$, respectively, in FIGURE 1. The sum voltage information is applied through an IF transformer 10, and the difference voltage signal information is applied to the IF transformer 11, as illustrated by the signal waveforms A and B. The secondary winding of each IF transformer 10 and 11 is center-tapped to ground with each secondary winding of the IF transformer 10 in parallel with a resistance 8 and with each secondary of the IF transformer 11 paralleled by a resistance 9. The IF transformer 10 has a trimmer capacitor 12 coupled in parallel with the secondary, and the IF transformer 11 has a trimmer capacitor 13 coupled in parallel with its secondary, as is well understood by those skilled in the art for trimmer tuning of the IF transformers. The output leads of the IF transformer 10 are coupled respectively to the two cathodes of a dual diode 15, the anodes of which are coupled in common. The IF transformer 11 has one output lead 16 coupled to a branch conductor 19, the branch conductor 19 being coupled through capacitors 19a and 19b to one anode each of two dual diodes 17 and 18. The other secondary output 20 of the IF transformer 11 is coupled to a branch conductor 21 which branch conductor 21 is coupled through capacitors 21a and 21b to one each cathode of the dual diodes 17 and 18. The other cathode and anode of the dual diode 17 are coupled in common to one secondary output of the IF transformer 10, and the other cathode and anode of the dual diode 18 are coupled in common to the other secondary output of the IF transformer 10. Two radio frequency (RF) chokes 22 and 23 with an intermediate potentiometer 24 are coupled in series across the anode and cathode of the dual diode 17 which anode and cathode are coupled respectively to the IF transformer inputs 19 and 21. Likewise, two RF chokes 25 and 26 with an intermediate potentiometer 27 are serially coupled across the anode and cathode of the dual diode 18 which anode and cathode are coupled respectively to the IF transformer secondary outputs 16 and 20. The adjustable tap of the potentiometer 24 is coupled to one anode of a clipper dual diode 30, and the adjustable tap of the potentiometer 27 is coupled to the other anode of the dual diode clipper 30. The potentiometers 24 and 27 are used to null the phase detector circuits when there is a signal present in the sum input. The common anode coupling of the dual diode 15 is coupled through a summing resistor 33 to a summing point 32, and the common cathode coupling of the clipper dual diode 30 is coupled through a summing resistor 31 to the summing point 32. The video voltages summed at the summing point 32 are developed across a resistor 34 connected between the summing point 32 and a fixed potential such as ground.

The summed video voltage at the summing point 32 is applied directly to the grid of a triode 35 in a clipping amplifier circuit, the triode anode of which is coupled on an anode voltage through an anode load resistor 36. The anode output of the triode amplifier 35 is coupled through a diode 37 and a capacitor 38 to the output conductor 39 of an output circuit of the crossover detector. The diode 37 is oriented with its anode coupled to the anode of the triode 35 and its cathode coupled to the output coupling capacitor 38. The cathode of the diode 37 is coupled to the adjustable tap of a potentiometer 40, the resistance element of which is in series with resistances 41 and 42 of a voltage divider circuit coupled across the anode voltage supply and ground. The adjustable tap of the potentiometer 40 in the voltage divider circuit 41 and 42 sets the clipping level of the clipper amplifier circuit to clip negative video voltage pulses from the output circuit 39. The video voltage coming from the output 39 of the crossover detector is applicable to the radar receiver indicator circuit (not shown) to produce high resolution of target objects intercepted by the radar in the boresight area supplying the sum and difference voltage signal information to the IF transformers 10 and 11.

In the operation of this device let it be assumed that the crossover detector of this invention is coupled in the IF sum and difference channels of a radar receiver to receive sum voltage signals from a twin-lobe radar antenna at the input of IF transformer 10 and difference signals of the twin-lobe radar receiver at the input of IF channel 11. The sum voltage information, appearing as a modulated sine wave A at the IF input transformer 10, will be detected in the dual diode 15 to produce a video voltage at the common anode output. The dual diode 15, being coupled as shown, will produce only a negative video voltage through the summing resistor 33 to the summing point 32. The difference voltage applied through the IF transformer 11, being a video modulated intermediate frequency voltage B, will be applied simultaneously to the left-hand anodes and cathodes of the dual diodes 17 and 18, as viewed in FIGURE 1. The other anode and cathode of each dual diode 17 and 18, being coupled in common, respectively, to the two secondary output leads of the IF transformer 10, produce reference voltages to the dual diodes 17 and 18 to determine the relative sum and difference phase relation of the sum and difference voltages. Let it be assumed for the purpose of a first example of operation that a sum signal is present but that no difference signal is present. With the polarity of the sum signal applied to the dual diodes 17 and 18 as shown in FIGURE 1, the upper diode of dual diode 17 and the lower diode of dual diode 18 will conduct to produce a voltage across the capacitors 19a and 21b. Then upon reversal of phase of the sum signal the lower of dual diode 17 and the upper of dual diode 18 will conduct to produce a voltage across the capacitors 19b and 21a. The capacitors 19a and 19b as well as capacitors 21a and 21b will be charged in equal and opposite polarity which will produce a voltage drop across each voltage division means consisting of the RF chokes and potentiometers 22, 23, 24 and 25, 26, 27. The output of each of the potentiometers 24 and 27 will be zero. This should be true to condition the crossover detector for proper operation of phase detection as hereinbefore stated. If zero outputs are not obtained, these potentiometers should be adjusted to establish zero output from each potentiometer 24 and 27. Assume for the purpose of a second example of operation that the phase relation of the sum and difference signal information at one instant at the IF transformers produce the phase relation as shown by the + and − signs on the diode terminals in FIGURE 1. Since the sum signal is in actual practice always larger in amplitude that the amplitude of the difference siganl, the same diodes will conduct as in the first example but the potentiometer 24 will now have a negative video voltage output on the adjustable tap thereof and the potentiometer 27 will have a positive video voltage output on its adjustable tap by virtue of the increased IF difference signal voltage on the upper diode of dual diode 17 and on the lower diode of dual diode 18, and at the same time, a decreased voltage on the lower diode of 17 and the upper diode of 18. In the example given based on the instantaneous phase relation shown by the + and − signs in FIGURE 1, the adjustable tap of the potentiometer 24 will pick off a negative video voltage while, at the same time, the adjustable tap of potentiometer 27 will pick off a positive video voltage. The positive video voltage from potentiometer 27 will be conducted through the clipping diode 30 while the negative video voltage from potentiometer 24 will be clipped by diode 30. Assuming in a third example of operation that the input difference signal voltage reverses in polarity, which is indicative of the intercepted target object being off boresight in a direction opposite to that in the first mentioned example, the + and − signs on the left terminals of the dual diodes 17 and 18, as viewed in FIGURE 1, will change. In this instance a negative video voltage will be developed at the tap of potentiometer 27 and a positive video voltage will be developed at the tap of potentiometer 24. The positive video voltage will again be conducted through the diode 30 while the negative video voltage will be clipped. As may be realized from the above operation, the two dual diodes may be considered as operating in push-pull, 180 degrees out-of-phase.

If the target object intercepted by the radar system supplying the sum and difference signal voltages were on boresight, the negative detected video voltage output on the common anodes of the dual diode 15 would be a maximum and the positive video voltage taken from the common cathodes of the dual diode 30 would be zero. As the target object intercepted moves away from boresight, the difference signal voltage would appear through the IF transformer 11 to produce a corresponding amplitude increase in positive video voltage on the cathode output of the dual diode 30 reducing the negative sum video voltage coming from the dual diode 15 at the summing point 32. Accordingly, the video voltage at the summing point 32 will vary from a maximum negative video voltage at which time the target is on boresight to a negative video voltage of decreasing amplitude as the target deviates from either side of boresight. When the target becomes too far off from boresight this circuit becomes ineffective to produce an output voltage on the output circuit 39 as will soon be made clear.

The summed video voltage at 32, being applied to the control grid of the triode 35 in the clipping amplifier circuit, will produce an amplified and inverted video voltage across the anode resistor 36. The maximum positive video voltage output on the conductor 39 will be attained when the target is on boresight at which time the maximum negative direct current voltage from the dual diode 15 is applied to the control grid of the triode 35 reducing the dual triode 35 to its minimum conductive state which produces the least amount of video voltage drop across the anode load resistor 36. As the target deviates from either side of boresight, the summed video voltage at the summing point 32 will become less negative which will produce greater conduction of the triode 35 and thereby reduce the positive output video voltage on the output circuit 39. At a point where the summed video voltage at the summing point 32 approaches a value to produce a conductive state of the triode 35 to cause negative voltage swings on the anode of the triode 35, these negative video voltage swings will be clipped by the diode 37 so that no negative video voltage appears on the output of the circuit 39. In this manner only a video voltage output on the conductor 39 is developed in positive amplitude proportional to the amount that the target is on or near boresight which voltage is utilized to increase the resolution of the radar indicator circuits to provide target resolution for radar target tracking personnel. As the intercepted target is removed from boresight, the target resolution voltage drops off until it becomes nonexistent at a point where target video is no longer desired.

Referring more particularly to FIGURE 2, there is shown an alternate means or construction which could be used to replace the IF transformers 10 and 11 with two transistor coupled phase inverter transformer means. The IF sum or difference signals in this modification are applied to the base of a transistor 50. The emitter and collector are each coupled through a bifilar wound transformer 51 with a one-to-one ratio to produce two out-of-phase voltages on the output conductors 52 and 53. Since the emitter follows the base and the collector is 180° out-of-phase with the base, the outputs taken from the emitter and collector are out of phase and serve the same purpose as the IF transformers 10 and 11 in FIGURE 1. Where the modification shown in FIGURE 2 is used for the sum voltage the output conductors 52 and 53 would be connected, respectively, to the two cathodes of the dual diode 15. In like manner, where the modification shown in FIGURE 2 is used for the difference voltage channel, the outputs 52 and 53 would be connected to the branch conductors 19 and 21 in FIGURE 1. In actual practice a push-pull driver amplifier would be used in the coupling of the conductors 52 and 53 to the sum and difference channels for a good practical operating device although the driver amplifiers are not shown herein. The modification shown in FIGURE 2 is per se an invention of Charles E. David and Robert L. Haynes more particularly shown and described in their application, Serial No. 106,415, filed April 28, 1961, entitled "High Frequency Phase Inverter."

While many modifications and changes may be made in the constructional details and features of this invention, as by providing semiconductive diodes in dual relationship to replace the vacuum tube dual diodes shown and described above or by making other obvious substitutions to carry out this invention, applicant desires to be limited only by the spirit and scope of his appended claims, evoking the privileges of using generic terms to cover vacuum tube and semiconductor diodes.

I claim:

1. A direct current coupled crossover detector circuit comprising: means detecting the sum video signals in modulated sum and difference signal information; phase sensitive detector means detecting the difference video signals of that modulated sum and difference signal information, said phase sensitive detector means being referenced in phase to said sum modulated signals to produce phased difference video signals on an output thereof; means limiting the difference video signals, in a polarity opposite the polarity of said means detecting the sum video signals, coupled to said phase sensitive detector means output; means summing the outputs of said means detecting the sum video signals and said limiting means to produce a summed video voltage; and means limiting said summed video voltage in one polarity whereby the phase relation of the sum and difference video voltage signals of the modulated sum and difference signal information is detected in video signal amplitude of one polarity.

2. A direct current coupled crossover detector of a radar receiver circuit comprising: twin-lobe radar sum and difference modulated pulsed signal inputs; detector means coupled to receive said sum signals to detect the sum video signals therein for application as one input to a summing network; phase sensitive detector means coupled to receive said difference signals and to compare the difference video signals with said detected sum video signals to produce phase related video signals for application as another input to said summing network, said phase related video signals being limited in only one polarity; and clipping means coupled to receive the summed video signals and limit same in one polarity whereby said clipped video signals are proportional to the amount that the sum video signals exceed said limited phase related video signals.

3. A direct current coupled crossover detector circuit as set forth in claim 2 wherein said phase sensitive detector means includes a pair of double diodes cross-coupled to receive alternate phases of said difference signals on one anode of each double diode and on one cathode of each double diode, respectively, and with the other anode and cathode of each double diode coupled in common to receive alternate phases of said sum signals, said anode and cathode of each double diode in said cross coupling having adjustably tapped voltage divider means thereacross to produce video voltage output at each adjustable tap of an amplitude and phase proportional to the phase relation of said sum and difference signals.

4. A direct current coupled crossover detector circuit as set forth in claim 3 wherein said phase related video signals being limited in only one polarity are limited by a double diode coupling between said phase sensitive detector means and said summing network.

5. A direct current coupled crossover detector circuit as set forth in claim 4 wherein said clipping means includes a triode with the grid thereof connected to receive said summed video signals and the anode thereof coupled through a clipping diode providing an output across an anode resistor.

6. A direct current coupled crossover detector circuit as set forth in claim 2 wherein said coupling of said detecting means to receive said sum modulated pulsed signals and said coupling of said phase sensitive detector means to receive said difference modulated pulsed signals are each through a transformer means.

7. A direct current coupled crossover detector circuit as set forth in claim 6 wherein said transformer means includes a transistor having a base connected to the input signal, a collector coupled through the primary of one transformer, and an emitter coupled through the primary of another transformer, the secondaries of said last-mentioned transformers constituting the transformer outputs.

8. A direct current coupled crossover detector circuit of a radar receiver comprising: twin-lobe monopulse radar sum and difference signal inputs; sum and difference intermediate frequency transformers, each having a primary winding coupling the sum and difference signal inputs, respectively, and each having a grounded center-tapped secondary winding; means detecting the sum video signals from the sum intermediate frequency transformer to produce negative video voltage of said sum signals on an output thereof; a pair of double diodes, one anode of each of said double diodes being coupled to one secondary winding output of the difference intermediate frequency transformer, one cathode of each of said double diodes being coupled to the other secondary winding of the difference intermediate frequency transformer, and the other anode and cathode of each double diode being coupled in common, each common coupling being coupled respectively to one each secondary output of the sum intermediate frequency transformer; adjustably tapped voltage division means coupled across the anode and cathode of each double diode in the coupling of said difference intermediate frequency transformer to produce phase-related video voltages on the adjustable taps in alternately phased pulses; a clipping double diode having each anode thereof coupled respectively to each adjustable tap to pass the positive portions of the phase-related video voltage pulses on a common cathode output thereof; a summing network coupled to the common cathode output of said clipping double diode and to said detecting means output; and a clipping amplifier network coupled to receive the summed positive and negative video voltages and to clip negative output video voltage from the amplified output whereby the phase angle relation of the sum and difference signals is detected as a video positive voltage proportional in amplitude to the proximity of a target object producing the sum and difference signals to the boresight of the twin-lobe radar.

9. A direct current coupled crossover detector circuit as set forth in claim 8 wherein said means detecting the sum signals consists of a double diode having the cathodes thereof coupling the secondary windings respectively of said sum intermediate frequency transformer and the anodes thereof are coupled in common to said summing network.

10. A direct current coupled crossover detector circuit as set forth in claim 9 wherein said clipping amplifier includes a triode having the grid thereof coupled to receive said summed positive and negative video voltages and an anode connecting an anode supply voltage through an anode load resistor, said anode being coupled through a clipping diode biased to clip negative video voltage on said clipping amplifier output.

11. A direct current coupled crossover detector circuit as set forth in claim 10 wherein said couplings of said pair of double diodes to said difference intermediate frequency transformer are capacitor couplings with the capacitors being in said couplings between said difference intermediate frequency transformer and said adjustably tapped voltage division means to block direct current voltage from said difference intermediate frequency transformer.

12. A direct current coupled crossover detector circuit as set forth in claim 11 wherein said adjustably tapped voltage division means each consists of a potentiometer flanked on each side of the potentiometer resistance by an inductance coil in series.

No references cited.